Figure 1:
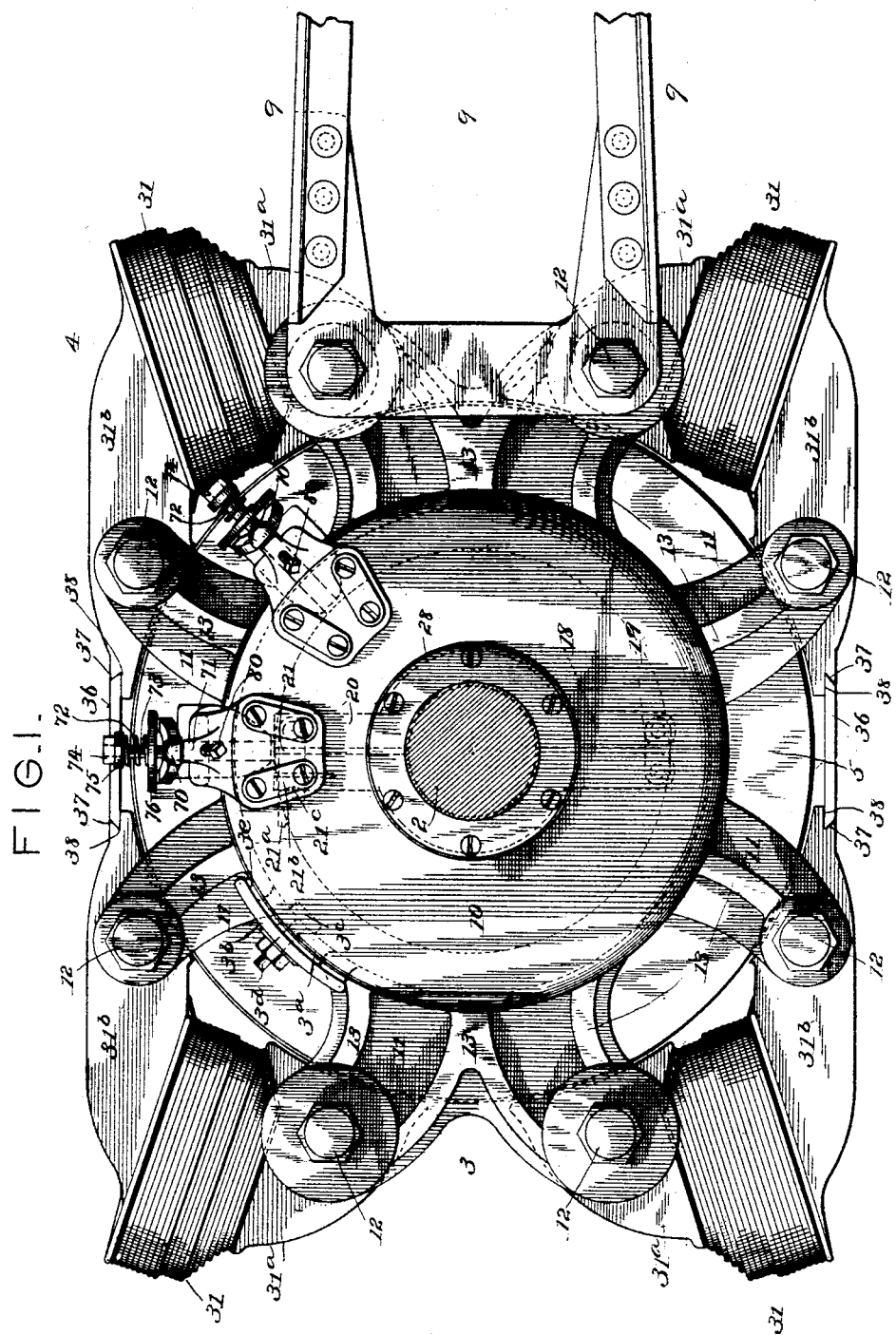

(No Model.)  4 Sheets—Sheet 1.

W. BAXTER, Jr.
ELECTRIC MOTOR FOR STREET CARS.

No. 516,516.  Patented Mar. 13, 1894.

Witnesses:
Harry S. Rohrer
William E. Knight

Inventor:
W<sup>m</sup> Baxter Jr.
By Hervey S. Knight
Attorney.

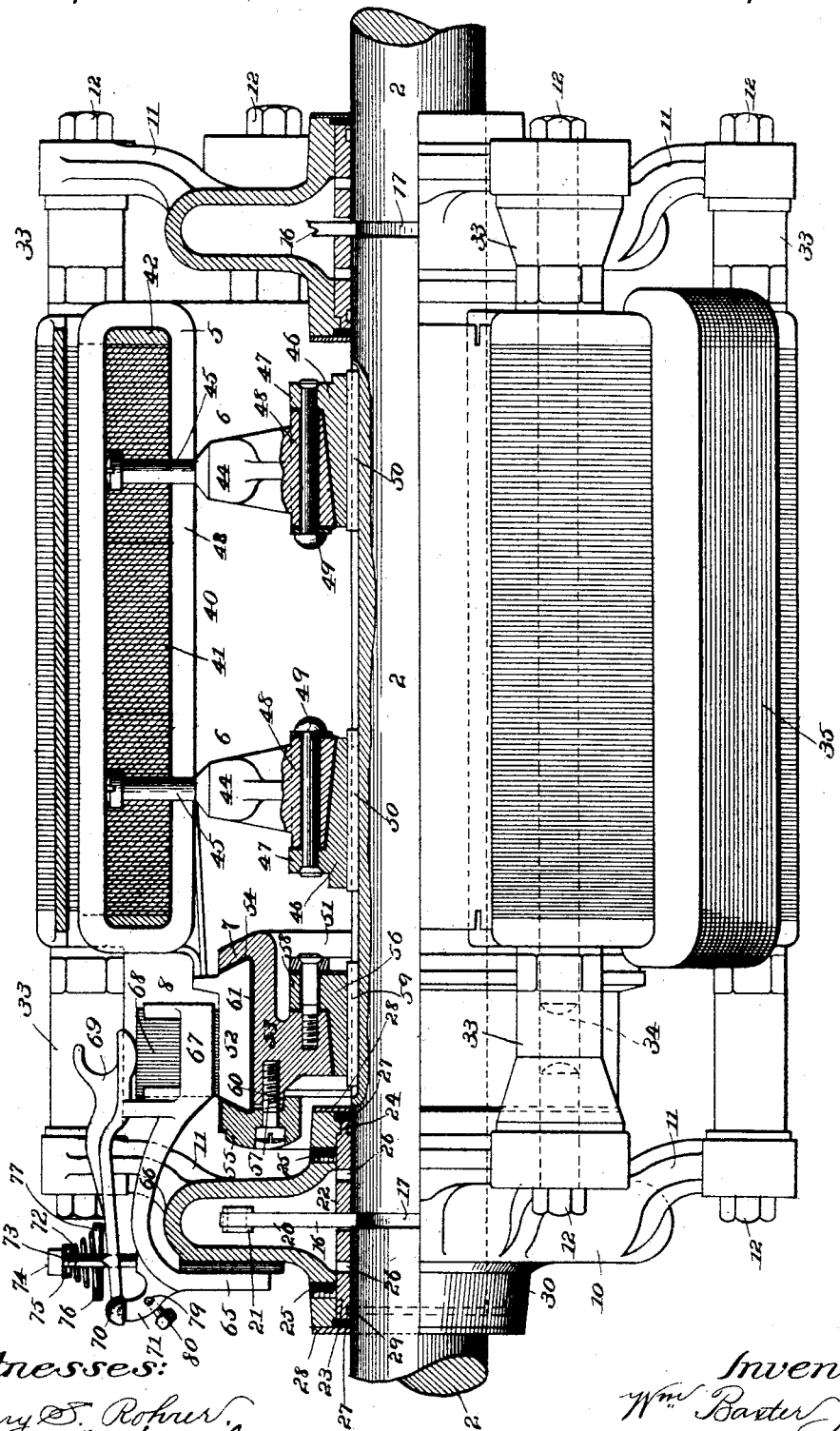

(No Model.) 4 Sheets—Sheet 3.
W. BAXTER, Jr.
ELECTRIC MOTOR FOR STREET CARS.
No. 516,516. Patented Mar. 13, 1894.
FIG.11.ª
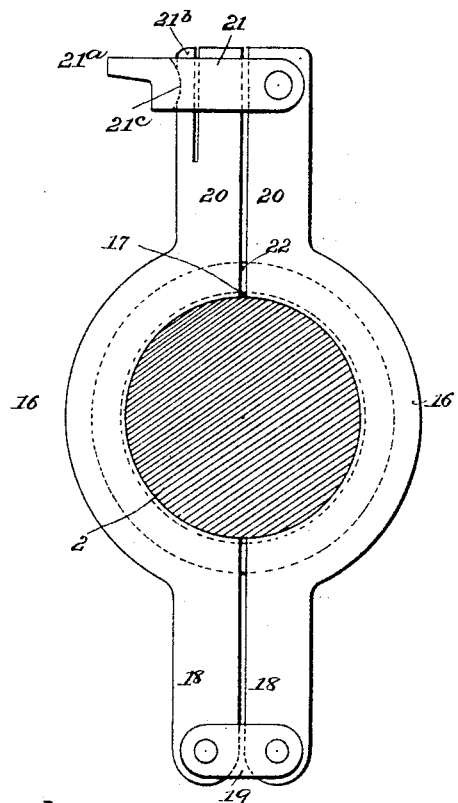
FIG.11.ᵇ
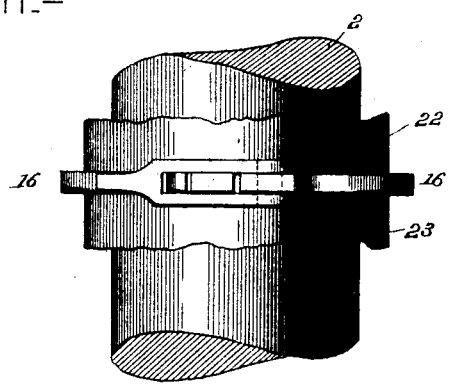

(No Model.) 4 Sheets—Sheet 4.
W. BAXTER, Jr.
ELECTRIC MOTOR FOR STREET CARS.
No. 516,516. Patented Mar. 13, 1894.
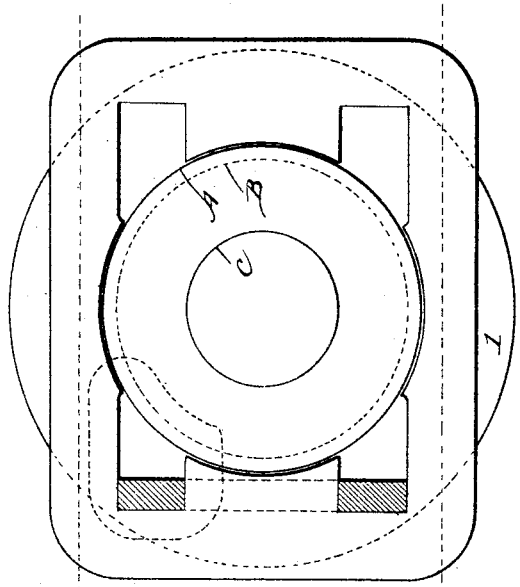
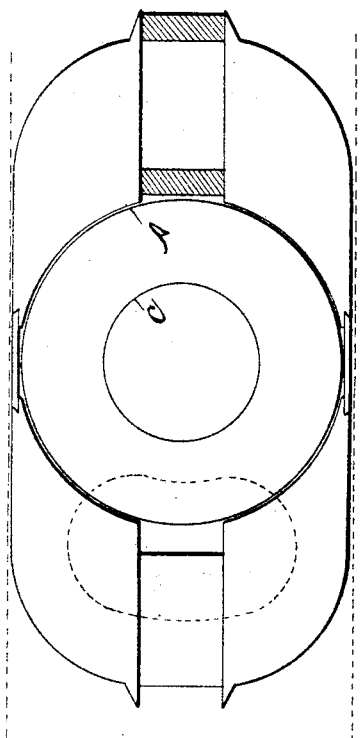
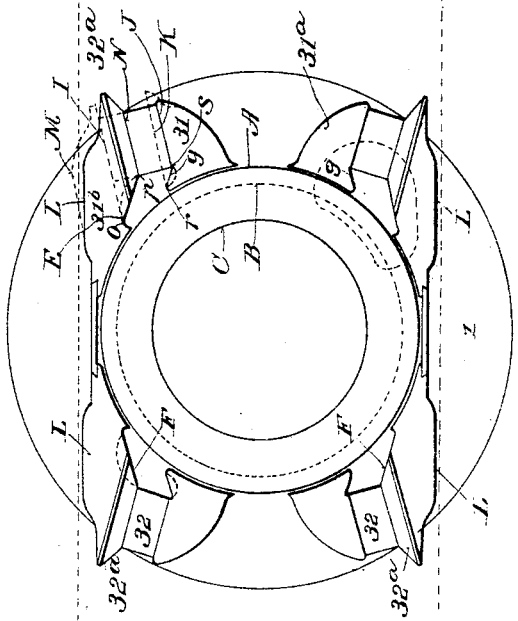
Witnesses:
Harry S. Rohrer
A. H. Knight
Inventor:
Wm Baxter Jr.
By Hervey S. Knight
Attorney.

UNITED STATES PATENT OFFICE.

WILLIAM BAXTER, JR., OF BALTIMORE, MARYLAND.

ELECTRIC MOTOR FOR STREET-CARS.

SPECIFICATION forming part of Letters Patent No. 516,516, dated March 13, 1894.

Application filed April 4, 1891. Renewed July 8, 1893. Serial No. 479,955. (No model.)

*To all whom it may concern:*

Be it known that I, WILLIAM BAXTER, Jr., a citizen of the United States, residing at Baltimore, in the State of Maryland, have invented certain new and useful Improvements in Electric Motors for Street-Railway Cars, of which the following is a specification.

My invention relates to the construction and arrangement of the motor or motors of an electric locomotive and the object of my invention is to produce a simpler or more economical device mechanically, than has heretofore been suggested.

In the construction of locomotives especially for application to street cars and in locating the same beneath the car several difficulties are encountered. It is difficult to get machinery of light structure which will develop and maintain the adequate horse power. Furthermore it is difficult to get sufficiently powerful machinery to occupy the limited space beneath the car. The limited space has prevented the use of large armatures and in order to maintain the necessary constant power with a small armature high speed and reducing gear have to be resorted to.

My present invention consists in mounting immediately upon the car wheel axle a motor having the field so arranged that a sufficiently large armature may be employed to develop the power and maintain constant rotation at a low speed, and thus do away with all gearing and all its incidental noise and expense which constitute such serious objections to the motor as heretofore constructed. The armature and field are carried by, and the armature is keyed to the car-wheel axle the field being journaled on the axle and held against rotation by a horizontally extending frame attached to some part of the car body, car truck or to the opposite axle. If two motors are employed, (which I do not find necessary for ordinary use) the non-rotating parts of the respective motors may be connected together by any suitable means. The vertical diameter of the armature is nearly co-extensive with the vertical height of the machine. The field may have four, six or eight poles, though I prefer an eight pole machine. By the use of the multipolar type of machine and the distortion of the magnets to which I resort, it is possible to obtain the necessary strength of field within the limited space available for the same. The field is arranged in the following manner. The magnets are divided equally by the vertical diameter of the machine and distorted in such a way that the upper and lower poles lie in the upper and lower horizontal planes tangential to the armature, said planes cutting the poles at or about the middle. The other poles are located on each side and are bent around to the periphery of the armature as nearly to the proper points as the cross section of metal will permit.

My invention further consists in certain details in the construction of the motor, all of which will be particularly pointed out in the claims, being first fully described with reference to the accompanying drawings, in which—

Figure I is an end elevation of a motor of eight poles mounted on the car wheel axle. Fig. II is a side elevation of the same partly in section. Figs. II$^a$ and II$^b$ are detached views, in side elevation and plan, respectively, of the retaining collar and parts of the axle and bushings. Fig. III is a view similar to Fig. I illustrating, on a reduced scale, a four pole machine. Figs. IV and V are views of the preferred form of machine and also of a four pole machine to be hereinafter referred to.

1 represents the car-wheel, 2 the car-wheel-axle, 3 the end frames which are journaled on the axle and support the field 4, 5 the armature which is supported by suitable spiders 6 keyed to the car-wheel-axle, 7 the commutator and 8 represents the brush holders. The field magnet is prevented from rotating by the laterally extending brace 9, secured to the end frames by bolts 12. The end frames 3 are exact duplicates, and each consists of an annular body or hub 10 from one side of the periphery of which extend radial arms 11 slightly set off as shown for the purpose of economizing space as will hereinafter appear, (see Fig. II) and adapted to receive at their outer ends bolts 12 which support the field magnets. These arms 11 are made thin in cross section and they may be provided with transverse ribs 13, terminating at the outer ends in annular flanges for receiving the heads of the bolts 12. The radial arms 11 are not located at equal distances apart on the circumference of the hub. The top and bottom arms are located at such points as to properly support the top and bottom horizontal poles and the lateral arms are likewise adapted to receive the inner poles. The location of the inner poles is such that the lateral arms unite as shown. This I find very advantageous as it strengthens the frame at points where the same is necessary, and to further stiffen the structure, the arms are made heavier and provided with flanges on their meeting and outer edges. Correspondingly heavy bolts and non-magnetic parts are employed in connection with the lateral arms as it is obvious that severe strain will be imposed upon the end frames by the vibration of the truck, and attachment of the brace 9. The end frames are hollow and they afford housings for the retaining collars 16 which prevent endwise movement of the end frames on the car axle. Each retaining collar 16 is formed in halves and enters an annular groove 17 in the car-wheel axle, said halves being held together on one side by a pair of arms 18 connected by a link 19, and on the other by a pair of arms 20 carrying a spring clasp 21. This spring clasp 21 consists of a plate 21$^a$ secured by a pintle to one of the arms 20 and provided with a perforation adapting it to fit over the other arm 20 on the outer face of which is a spring tongue 21$^b$ formed by slitting the metal. A knob and countersink 21$^c$ on the plate, and spring tongue respectively, serve to keep the former in position over the latter.

In the periphery of the hub of each end frame is formed a hand-hole 3$^a$ closed by a cap-plate 3$^b$ and retaining cross-bar 3$^c$ and screw 3$^d$. Suitable packing 3$^e$ inserted between the cap-plate and periphery of the hub renders the opening oil-tight. The retaining collars 16 are readily inserted endwise through these hand-holes and afterward clamped in position. It is obvious that a single bolt and nut could be passed through the perforations in the arms 20 or any equivalent device could be used as a substitute for the spring clasp 21.

Each end frame has a brass bushing formed in two halves 22, 23 slipped in from the outer end. The inner half of the bushing 22 abuts against a shoulder 24 formed on the box and is therefore retained firmly against movement relatively to the box in that direction. Both of the halves are retained against outward displacement by set screws 25. Inasmuch as the inner halves of the bushings of each box abut inwardly against the retaining collars 16, longitudinal shifting of the field on the car axle is prevented without the assistance of the outer halves 23, and a rigid structure is obtained.

The boxes or housings are partially filled with oil and the bearings, therefore, are constantly lubricated, the oil being thrown up by the diametrically opposite arms 18, 20 of the retaining collar 16, and passing in to lubricate the bearing between the bushing and the axle, through vertical ducts 26 formed in the respective parts of the bushing.

In order to prevent the escape of oil past the ends of the bushing, suitable oil tight packings 27 held by clamping rings 28 are employed in connection with the annular collecting channel 29 and return duct 30. With these parts constructed as described, the oil thrown up by the diametrically opposite arms of the retaining collar will rotate with the axle, will constantly circulate through the bearings, and it will thus be seen that the motor-magnet is mounted rigidly upon the car axle and retained securely against any undesirable vibration by self lubricating bearings, which may be readily removed and replaced as soon as they become worn.

It is obvious that the bushings could be made in one piece and adapted to abut against retaining collars placed at the sides of the frames in a housing formed for it without departing from the spirit of my invention.

The field consists of preferably four magnets 31 separated into two similar pairs on opposite sides of the vertical diameter of the armature, and having inner short poles 31$^a$ and upper and lower poles 31$^b$ lying in the upper and lower planes between which the machine is included tangential to the armature at opposite ends of the said vertical diameter. The inner poles 31$^a$, those at the front and rear sides of the machine, are brought around to the proper relation with the armature, conforming as nearly as possible without sacrificing the necessary cross section of metal, to regular distances apart, as will hereinafter appear. The magnets are supported from the corresponding arms of the end frames by means of bolts 12 passed through the arms, non-magnetic parts 33 into which the bolts are screwed and screw rods 34 pass through the respective poles of the magnets and enter the insulators 33. Between the lateral arms of the end frames and inner poles of the magnets which come between said arms, enlarged sleeves 34 of non-magnetic material are employed for giving stability to the structure. I prefer to construct the magnets of thin laminæ with cast metal face plates as described in my application filed February 28, 1891, Serial No. 383,200, but I do not broadly claim the same herein.

35 represents the winding, the greatest thickness of which is on the outer side because the outer poles are longer than the inner ones, and also because in my arrangement of the field, it can be better accommodated there. The adjacent ends of the upper and lower poles are connected by means of plates 36 having beveled edges 37 fitting in under-cut grooves 38 in said poles.

In flattening the field 4, it is necessary to resort to a particular formation of the sides of the wire space. For this reason as will appear on reference to Fig. IV the inner faces F of the upper and lower horizontal poles 31$^b$ must be made at least parallel with the outer faces, L, of said poles, and I prefer to make them inclined slightly downward from the horizontal line as shown though of course they could be made curved as indicated by dotted lines so long as the curved surface does not cut the metal at any point enough to reduce the cross section beyond the minimum. Whatever the form of the inner faces of the upper and lower poles is, the outer flanges 32$^a$ formed for supporting the upper side of the bobbin, is preferably made to correspond. The inner faces $g$ of the short poles 31$^a$ may likewise be of any form which does not reduce the cross section. I prefer to spread out the ends of the short poles 31$^a$ as shown, and while the inner faces of the poles may be curved, I prefer to make them flat, and corresponding to the shape of the opposite wall of the wire spaces formed by the inner faces F of the long poles. It will be seen that upon winding the wire in wirespaces of that shape, the coil assumes a dished annular form which has a special advantage as will hereinafter appear.

The essential features in the construction of the wire spaces are:—the formation of the long poles 31$^b$ at obtuse angles to the cores 32 and the short poles 31$^a$ at acute angles to the cores 32; the formation of the long poles 31$^b$ in such a way that the lines drawn from their inner edges $o$ to the adjacent edges $p$ of the cores will form an obtuse angle with the core; and the formation of the short poles 31$^a$ in such a manner that lines drawn from their inner edges $r$ to the adjacent edges $s$ of the cores will form an acute angle with said core. As hereinbefore stated, the face plates relieve the poles at points where there might be a choking. The particular form of magnets above described, accommodates sufficient winding, and cross section of poles to maintain its efficiency notwithstanding the distortion to which it is subjected for the purpose of reducing the vertical dimension of the machine. The formation of the inner face of the long pole adapts it to accommodate the requisite amount of wire without reducing the cross section of the pole. Spreading the end of the short pole reduces the air space at that point, and the forms of the two pole faces which define the wire space causes the wire coil to assume the particular dished annular shape which has the effect of massing the thickness of the coil at points farther toward the center of the magnet and also permits the core to be placed closer to the armature.

It will be seen on reference to Fig. III that the field may be made with four poles and be flattened in accordance with my invention, and it will be understood that the principle is also adapted for a six pole machine. The armature 5 is firmly secured to the axle by the spiders 6.

40 represents the armature ring constructed of laminæ 41 and face rings 42 and winding 43 all of which may be substantially similar to corresponding parts in my co-pending application above referred to. The armature ring 40 is secured to the spider arms 44 by means of bolts 45 passed through the ring and screwed into said spider arms. In order to secure the spiders to the axle oppositely tapered conical thimbles 46 having flanges 47 are inserted in the corresponding flared collars 48 wherein they are retained by rivets 49 passing through said collars and thimble flanges. Splines 50 inserted between the thimbles and the axle cause said axle to be rotated by the armature.

The commutator 7 consists of the hub 51 and the commutator plates 52 said hub consisting of the annular collar 53, having the under cut flange 54 which together with the correspondingly grooved annular plate 55 engages the beveled ends of the commutator plates, and the conical thimble 56 which enters the correspondingly flared opening in the collar 53 and is secured therein by screws 57 passed through a flange 58 on said thimble and threaded into said collar. A spline 59 inserted between the thimble and axle retains the commutator in fixed relative position with the armature and insures rotation therewith. The annular retaining plate 55 has a shoulder 60 which engages within the corresponding shoulder on the collar 53 and insures the centering of said retaining plate and through it the commutator plates in opposition to any possible unequal shrinkage in the insulation 61 inserted between said commutator plates and the parts which retain them.

The brush holders 8 are duplicates and such consists of a plate 65 by which it is secured to the end frame 3, the upwardly and inwardly curved arm 66, socket 67, the brush 68, fitting and vertically movable within said socket, the presser bar 69 having a bearing 70 on an arm 71 projecting outward from the arm 66, and the spring 72 confined upon the vertical post 73 by nut 74 and cap washer 75 and transmitting pressure to the knife-edge bearing 76 of the pressure-bar 69 through the medium of a cup washer 77.

The brush holder herein described is similar in principle and operation to that set forth in my co-pending application hereinbefore referred to and the same is therefore not claimed herein. If desired a perforation 79 may be formed in each of the arms 71 and conductors may be secured therein by screws 80.

As shown in Fig. II, the end frames, having the radial arms extending from one side of the periphery, are not placed upon the axle in opposite positions so as to bring the offsets of the arms on the inside but they are placed on the axle in the same direction. This brings the width of the machine to a minimum and obviates the necessity of setting the frame out on either end to afford room for the adjacent parts and the arms at one end overhang, to a limited extent, the commutator.

Referring to Figs. III, IV and V; Fig. III shows a four-pole axle-motor, with the poles on each side of the vertical line; Fig. IV shows an eight pole axle motor; and Fig. V a four pole motor, with the poles on top and bottom, and on the sides. From these figures it will be seen that the motor shown by Fig. V cannot be confined within as narrow limits as an eight pole machine, and although the motors shown in Fig. III can be made narrower, it will be very much heavier and not as good as that shown in Fig. IV. In the three figures the thickness of the various parts of the field are drawn, to the same scale. The circle "A" is the outside of the armature teeth, the circle "B" represents the bottom of the grooves between the teeth in which the wires are wound, and the circle "C" represents the inside diameter of the armature core, so that from "B" to "C" is solid metal.

Fig. V shows the size that the field will have to be, provided it is made of laminated wrought iron, as the motor shown in Fig. IV is. Practically, such a field would be very difficult to construct, and if it were made of cast iron, which would be the only other alternative, the dimensions would be increased about forty per cent., and make it clumsier than it is shown.

In Fig. IV a different shape magnet has been dotted out in one corner to illustrate the amount that is gained in the height of the motor by the distortion of the space in which the wire is wound. If the line "F" instead of being drawn down at a very obtuse angle to the line "H," were drawn at right angles to it, as ordinarily done in the space for winding it would follow the line marked "I," and in order to get enough thickness of metal in the upper part of the magnet to carry the lines of force, it would be necessary to move the lines "L" up to the line "M." If line "F" were not moved up to line "I," as shown, but left in its present position, and the line "J," "G" continued at right angles to "H," then the space for the wire would not be sufficient, but if the line "G" is drawn as shown at an acute angle with "H," sufficient room for the wire can be made. Thus it will be seen that the shaping of the field in this way enables me to get all the room necessary for the wire, and at the same time, sufficient metal in the top pole to carry the lines of force without choking. One part of the magnet that is still contracted is the part at the point "E;" but to compensate for this I put a piece of iron on each side of the magnet (the face plates of the magnets) which extend from the line "N" out to the point; and thus by widening the magnet at this point I get the necessary cross section. The space allowed for wire in Figs. III and V is larger than in Fig. IV, because the magnetic circuit for these two figures is longer, as will be seen by comparing the dotted lines. The air space is the same in each case.

Up to the present time the difficulties of placing a motor upon the axle of a street railway car have not been overcome. The reasons are numerous. The space beneath a car available for the accommodation of a motor is very limited. The car cannot be raised from the ground a greater distance than is customary because the passengers are obliged to enter from the street level; and it is absolutely necessary to have the motor travel at a certain distance, at least, from the ground so as to avoid contact with unevenness in the road-bed and obstructions of other kinds. The longitudinal space for the motor, that is to say the space between the car-wheels, is also restricted in view of fact that the brake-rods and other parts are accommodated between the wheels and it is therefore necessary to use a motor which develops sufficient power without taking up too much space this way. A further difficulty has been in getting machinery of sufficiently light weight. And a most important consideration has been to get a motor of proper dimensions which would be qualified to run at a very low rate of speed and at the same time have sufficient power. In practice I find that it is necessary to construct an axle motor for the limited space beneath a street car, capable of developing thirty horse-power, with a torque of thirty-five hundred pounds on the periphery of the armature, which amounts to twenty-two hundred pounds on the periphery of the car-wheel, and to maintain that power while rotating at a speed of from ten to one hundred revolutions per minute.

In the motor constructed in accordance with my invention herein described it will be seen that all the above difficulties are fully met and overcome.

In Figs. III and IV and especially in the latter I have shown machines which can be constructed of such size as to be readily accommodated between the car-wheels and between the car floor and the lower limit or safety line, (which I find should be at least four and one half inches above the tread of the rail) and be mounted on the axle. And such machines, when constructed to occupy this space, will fully serve the purpose for which they are intended. The force of the above will be better understood by comparing Figs. IV and V which are constructed with the same size armature and drawn to the proper scale, and with a certain relation to the car-wheel, Fig. IV being drawn as large as practicable and also with as small an armature as is expedient. Furthermore, the dimensions of the parts of the machines are drawn as small as possible so as to occupy all the available space between the wheels and the machines are assumed to be the same length. It will be seen that the four-pole machine which has the poles at top and bottom occupies entirely too much vertical space to be carried on the car-wheel axle with safety. If the machine is reduced in size, the armature must be reduced in size. This will diminish the efficiency of the machine. If the armature is reduced, the field must be made heavier by an increase in cross-section of metal, and the same is true of the cross-section of the armature ring. Now it is obvious that if the opening in the armature ring is diminished to any extent the wire cannot be accommodated as a ring winding, but the drum winding must be resorted to. This would so increase the length of the machine that it could not be accommodated between the wheels. It will thus be seen that to construct a machine in accordance with my invention is the only practical way to get a machine which can be mounted on the axle and between the wheels of an ordinary street car.

I do not herein claim, broadly, an electric motor having the field divided into two parts, similarly arranged on opposite sides of the vertical diameter of the armature and the upper and lower poles lying in upper and lower horizontal planes between which the whole machine is included, whereby nearly the entire vertical space is available for the diameter of the armature; for such is claimed in my copending application Serial No. 383,200.

Having thus described my invention, the following is what I claim as new therein and desire to secure by Letters Patent:

1. The combination with the car-wheel and axle; of the motor supported by and mounted concentrically upon said car-wheel axle, said motor having the field divided into two parts arranged on opposite sides of the vertical diameter of the armature and the upper and lower poles lying in substantially horizontal planes between which the entire machine is included.

2. The combination with the car-wheel and the car wheel axle; of the motor supported by and mounted upon said axle and having its field divided into two equal parts similarly arranged upon opposite sides of the vertical diameter of the armature and the upper and lower poles lying in substantially horizontal planes between which the entire machine is included.

3. The combination with the car-wheel and its axle; of the armature secured upon said axle so as to rotate therewith and the field supported in proper relation to said armature and having its upper and lower poles lying in the upper and lower horizontal planes between which the entire machine is included, whereby almost the entire available vertical space of the machine is occupied by the armature.

4. The combination with the car-wheel and the car wheel axle; of the motor consisting of an armature keyed to the car wheel axle and the field supported in the proper relation to the armature by, and supported upon the car axle, said field being divided into two equal parts similarly arranged on opposite sides of the vertical diameter of the armature and its upper and lower poles being located respectively in the upper and lower horizontal planes tangential to the armature and between which planes the remaining parts of the machine are included.

5. The combination of the axle 2, the armature keyed to said axle, the end frames mounted upon said axle the field magnets supported by said end frames and the retaining collars; said end frames being hollow and constituting oil tight housings for the retaining collars substantially as explained.

6. The combination of axle 2, the armature keyed to said axle, the end frames having bearings upon said axle, the arms connected by offsets to said frames and the magnets supported by said arms substantially as and for the purpose set forth.

7. The combination of the armature, the field, the end-frame supporting the field, and the brush holder; said end-frame comprising a hub 10 and field supporting arms 13, extending from said hub with a space between them, and the brush holder being located in said space between the arms, substantially as and for the purpose set forth.

8. The combination of the end-frames 3, the field 4 located between the end frames, the supporting brace 9, and the bolts 12 supporting both the field and supporting brace on the said end frames, substantially as and for the purpose set forth.

9. The end frame 3, having the housing, an opening $3^a$ in the wall of said housing and the cap $3^b$ for closing said opening, substantialy as and for the purposes set forth.

10. The combination of the end frame for supporting the field, the laterally extending integral arms 13 having oppositely curved ends and the supporting brace 9, substantially as and for the purpose set forth.

11. The combination of the field, and the supporting end frames; said end frames having arms, 13, arranged on opposite sides of the vertical diameter of the machine and extending in opposite directions therefrom, whereby they support the field without projecting beyond the upper and lower planes between which the machine is included, substantially as explained.

12. The combination, in an electric locomotive, of the axle 2, the end frames 3 having housings 15 and arms for supporting the parts, the retaining collars secured to the axle within said housings and the bushings secured within said frames and abutting against said retaining collars, substantially as and for the purpose set forth.

13. The combination of the axle 2, the end frames 3 having oil tight housings 15, the bushing 22, 23 the retaining collar 16, said collar being formed in parts and having the securing arms 18 and 20 and means for holding them together, substantially as and for the purpose set forth.

14. The combination of the axle 2, the supporting frame 3, having housing 15, the bearing for said frame and the securing collar 16 fitting in an annular groove 17 in the axle, said collar being formed in two parts and provided with means for holding them together.

15. The combination of the axle 2, the end frames having housings 15, the securing collars fixed against movement longitudinally on the axis and the bushings 22 inserted in the end frames 3 on the same relative sides of the securing collars and adapted to abut against shoulders 24 on the frames and against said securing collars 16, all substantially as and for the purposes set forth.

16. The combination of the axle, 2, the frame 3, having housings 15, the bearing between said frame and the axle and the securing collar 16 formed in two parts and having the lower arms 18 hinged together and the upper arms 20 provided with a spring clasp 21, substantially as and for the purpose set forth.

17. The herein described support for the magnet consisting of the end frame adapted to be journaled on the axle and having the supporting arms, the housing and the handhole through which the retaining device may be inserted, substantially as and for the purpose set forth.

18. A multiple-field motor, distorted substantially as described and having the upper and lower poles lying in upper and lower horizontal planes, substantially horizontal, as shown, the lines between the inner edges of the outer poles and the inner edges of the core being at an obtuse angle to the cores of the magnets substantially as and for the purpose set forth.

19. A multiple-field motor, having the upper and lower poles lying in substantially horizontal planes, and so formed that the line between the inner edges $o$ of the short poles $31^a$ and the adjacent edges of the cores will form an acute angle with the core, substantially as and for the purpose set forth.

20. A multi-polar motor having flattened fields, whose upper and lower poles $31^b$ lie in horizontal planes between which the machine is included, and form obtuse angles with the cores 32, and whose inner poles $31^a$ form acute angles with said cores 32, substantially as and for the purpose set forth.

21. In an electric locomotive, the combination of the car wheel axle, the armature keyed to said axle, the field, the end frames journaled on the axle, and supporting the field, and the retaining collars secured on the axle for preventing lateral shifting of the frames thereon, substantially as and for the purpose set forth.

22. The combination of the car wheel axle, the armature keyed to said axle, the field journaled on said axle and surrounding the armature and the laterally projecting frame attached to the field for preventing rotation of the field substantially in the manner explained.

23. In combination with an electric motor having the field distorted as explained and the wire space formed between the poles; the face plates on the sides of the poles to increase the cross section, as explained.

WILLIAM BAXTER, JR.

Witnesses:
HENRY S. KNIGHT,
OCTAVIUS KNIGHT.